United States Patent
Lee et al.

(10) Patent No.: US 6,196,792 B1
(45) Date of Patent: Mar. 6, 2001

(54) PREFERENTIALLY COOLED TURBINE SHROUD

(75) Inventors: Ching-Pang Lee, Cincinnati; George A. Durgin, West Chester, both of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/239,638

(22) Filed: Jan. 29, 1999

(51) Int. Cl.$^7$ ..................................................... F04D 31/00
(52) U.S. Cl. ........................................... 415/116; 415/176
(58) Field of Search .................................. 415/116, 117, 415/173.1, 176, 178

(56) References Cited

U.S. PATENT DOCUMENTS 5,165,847 * 11/1992 Proctor et al. ......................... 415/115
5,503,527    4/1996  Lee et al. .

FOREIGN PATENT DOCUMENTS

| 516322A1 | 5/1991 | (EP) . |
| 694677A1 | 1/1996 | (EP) . |
| 2117451A | 10/1983 | (GB) . |
| 94/12775 | 6/1994 | (WO) . |

* cited by examiner

Primary Examiner—Edward K. Look
Assistant Examiner—Hermes Rodriquez
(74) Attorney, Agent, or Firm—Andrew C. Hess; Rodney M. Young

(57) ABSTRACT

A turbine shroud includes a panel having a forward end, an opposite aft end, and a middle therebetween. Cooling holes extend through the panel for channeling cooling air therethrough. The holes are arranged in a pattern of greater density aft of the panel middle than forward of the panel middle for effecting preferential cooling.

14 Claims, 3 Drawing Sheets

PREFERENTIALLY COOLED TURBINE SHROUD

BACKGROUND OF THE INVENTION

The present invention relates generally to gas turbine engines, and, more specifically, to turbine shrouds and blade tips therein.

In a gas turbine engine, air is pressurized in a compressor, mixed with fuel in a combustor, and ignited for generating hot combustion gases which flow downstream through one or more turbine stages which extract energy therefrom. A high pressure turbine (HPT) first receives the combustion gases from the combustor and extracts energy therefrom for powering the compressor. A low pressure turbine (LPT) follows the HPT for extracting additional energy for providing output energy typically used for powering a fan disposed upstream of the compressor in a typical aircraft gas turbine engine application.

The HPT includes a stationary turbine nozzle having a plurality of circumferentially spaced apart stator vanes which control discharge of combustion gases from the combustor. The HPT also includes at least one rotor stage having a plurality of circumferentially spaced apart turbine rotor blades extending radially outwardly from a supporting rotor disk. The blades include airfoils which receive combustion gases from the nozzle and extract energy therefrom for rotating the rotor disk and in turn rotating the compressor. The airfoils are typically hollow and include internal cooling circuits therein through which a portion of pressurized air bled from the compressor is channeled for cooling the blades.

Surrounding the rotor blades is an annular turbine shroud fixedly joined to a surrounding stator casing. The shroud is suspended closely atop the blade tips for providing a small gap or tip clearance therebetween. The tip clearance should be as small as possible to provide an effective fluid seal thereat during operation for minimizing the amount of combustion gas leakage therethrough for maximizing efficiency of operation of the engine. However, due to differential thermal expansion and contraction of the rotor blades and surrounding turbine shroud, the blade tips occasionally rub against the inner surface of the shroud causing abrasion wear.

Since the blade tips are at the radially outermost end of the rotor blades and are directly exposed to the hot combustion gases, they are difficult to cool and the life of the blade is thereby limited. The blade tips are typically in the form of squealer rib extensions of the pressure and suction sides of the airfoil, extending outwardly from a tip floor. Cooling air is channeled under the floor to cool the ribs by conduction. And, film cooling holes may extend through the floor to film cool the exposed ribs.

Since the turbine shroud is also exposed to the hot combustion gases, it too is also cooled by bleeding a portion of the pressurized air from the compressor, which is typically channeled in impingement cooling against the radially outer surface of the turbine shroud. Turbine shrouds typically also include film cooling holes extending radially therethrough with outlets on the radially inner surface of the shroud from which is discharged the cooling air in a film for cooling the inner surface of the shroud.

The holes are typically arranged in a pattern between the forward and aft axial ends of the shroud to provide uniform discharge of the cooling air through the shroud. Cooling air used to cool the blade tips and turbine shroud has limited effectiveness, and decreases the overall efficiency of the engine.

Accordingly, it is desired to provide an improved turbine shroud for cooperating with turbine rotor blade tips for improving cooling of the shroud, as well as the blade tips.

BRIEF SUMMARY OF THE INVENTION

A turbine shroud includes a panel having a forward end, an opposite aft end, and a middle therebetween. Cooling holes extend through the panel for channeling cooling air therethrough. The holes are arranged in a pattern of greater density aft of the panel middle than forward of the panel middle for effecting preferential cooling.

DETAILED DESCRIPTION OF THE INVENTION

Figure 1:
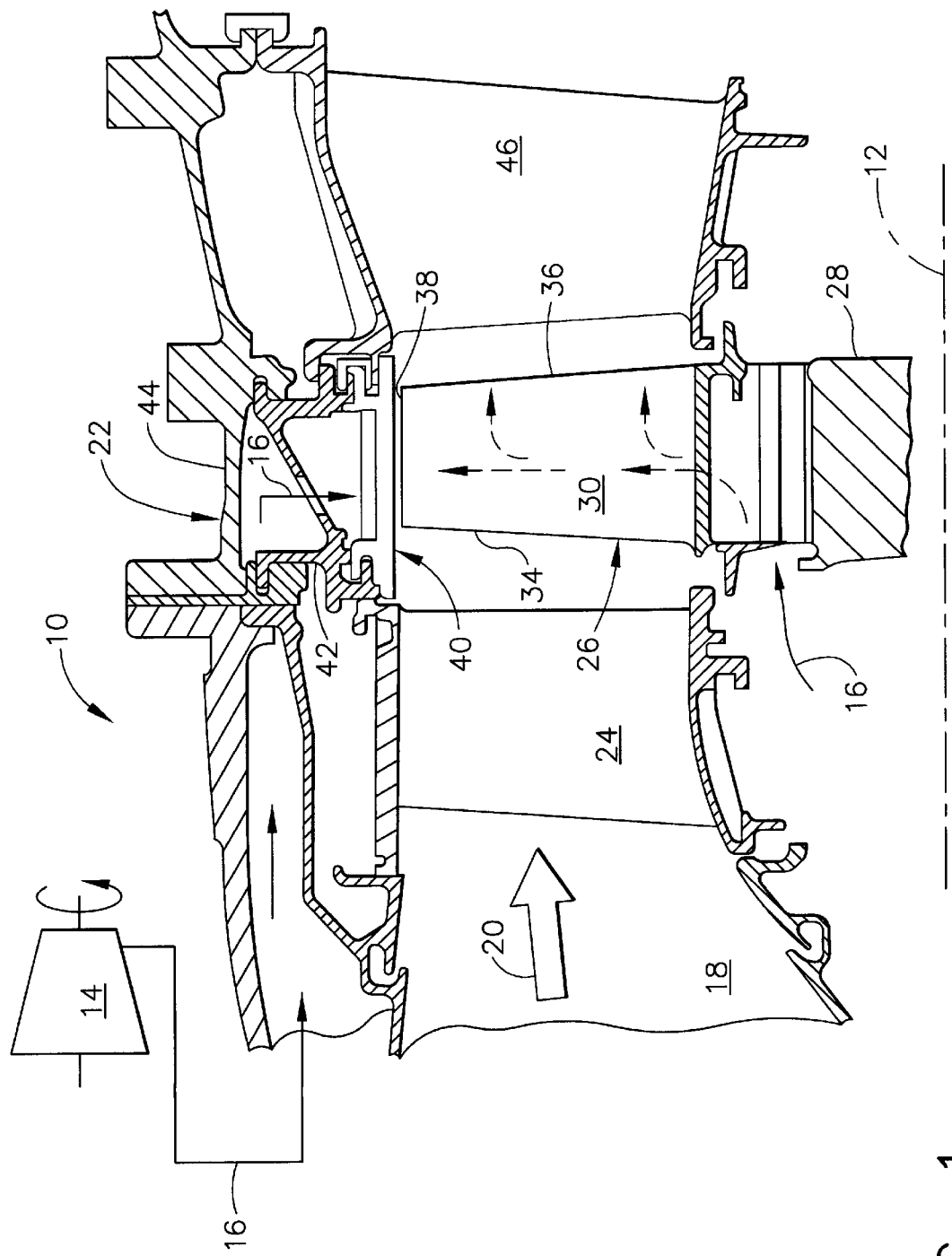
FIG. 1 is a partly sectional, axial view through a turbine portion of a gas turbine engine having a turbine shroud in accordance with an exemplary embodiment of the present invention.

Illustrated in part in FIG. 1 is a gas turbine engine 10 which is axisymmetrical about a longitudinal or axial centerline axis 12. The engine includes a conventional, multistage axial compressor 14 which pressurizes ambient air to produce compressed air 16.

The compressor is disposed in flow communication with an annular combustor 18, shown in aft part. A majority of the compressed air from the compressor is mixed with fuel in the combustor and ignited for generating hot combustion gases 20 which flow downstream therethrough. The combustion gases are discharged from the combustor into a high pressure turbine (HPT) 22 which extracts energy therefrom for powering the compressor 14.

The HPT 22 includes an annular stator nozzle 24 adjoining the discharge end of the combustor for receiving and turning the combustion gases therefrom. The nozzle is conventional and includes a plurality of circumferentially spaced apart stator vanes mounted at their radially outer and inner ends to corresponding annular outer and inner bands. Disposed immediately downstream from the nozzle is a row of turbine rotor blades 26 extending radially outwardly from a supporting rotor disk 28 which is conventionally configured and joined to the compressor 14 for the powering thereof.

Figure 2:
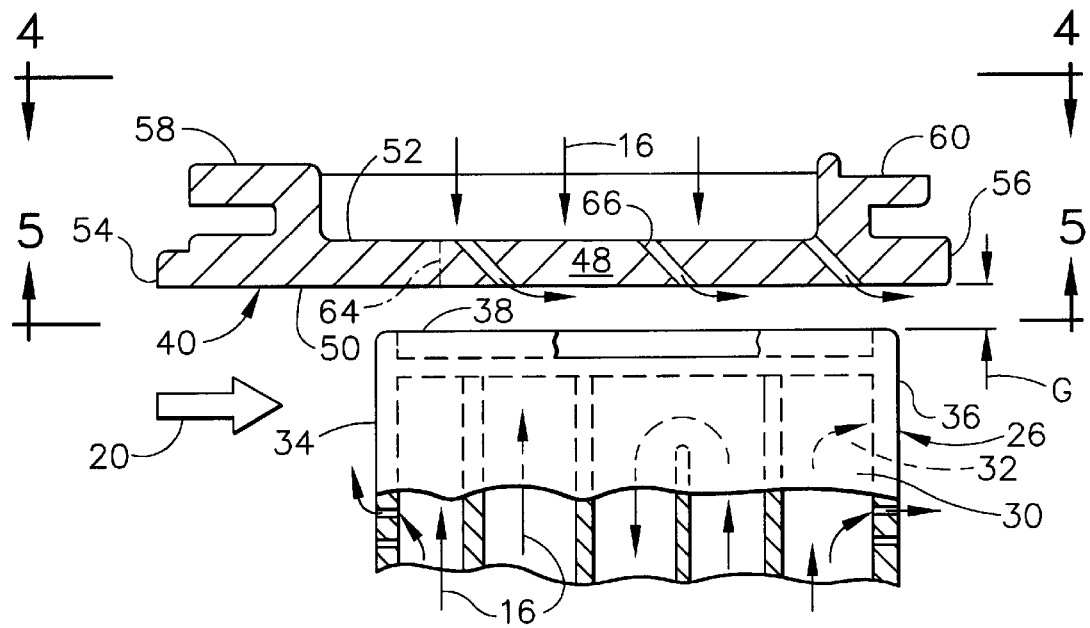
FIG. 2 is an enlarged, axial sectional view through a portion of the turbine shroud illustrated in FIG. 1 spaced atop the tip of a turbine rotor blade.

As additionally shown in FIG. 2, each turbine blade 26 is hollow and is conventionally configured for receiving a portion of the compressed air 16 bled from the compressor for the cooling thereof in any conventional manner. The airfoil portion of the blade extends radially outwardly from the rotor disk and includes a generally concave, pressure side 30 with a circumferentially opposite generally convex, suction side 32. The pressure and suction sides are joined together at axially opposite leading and trailing edges 34, 36.

The radially outermost end of the blade defines a blade tip 38 in the form of a rib extension of the two airfoil sides leaving an open tip cavity therebetween.

As initially shown in FIG. 1, a stationary turbine shroud 40 circumferentially surrounds the row of turbine blades 26 and is suitably joined to a hanger 42 which in turn is mounted in a surrounding stator casing 44 in any conventional manner. Disposed downstream from the HPT 22 is a turbine nozzle 46 of a low pressure turbine (LPT), shown in part, which includes one or more stages of low pressure turbine blades (not shown) which may be used for powering a fan (not shown) in an exemplary aircraft gas turbine engine application.

As shown in more detail in FIG. 2, the turbine shroud 40 is mounted atop the turbine blades 26 to provide a predetermined tip clearance or gap G with the blade tip 38. The tip clearance is made as small as practical for providing a fluid seal between the blade tips and the turbine shroud for minimizing the leakage of the combustion gases 20 therebetween during operation.

The turbine shroud is typically formed of a plurality of circumferentially adjoining, arcuate panels 48. Each panel includes a radially inner surface 50 which faces radially inwardly toward the blade tips 38 and defines therewith the tip clearance G. Each panel also includes an opposite, radially outer surface 52 against which is received in impingement a portion of the compressed air 16 suitably channeled thereto in a conventional manner for impingement cooling thereof.

Each panel also includes axially spaced apart forward and aft opposite ends 54,56 between which the inner and outer surfaces extend. A circumferentially extending forward hook 58 is integrally joined to the outer surface of the panel forward end, and a circumferentially extending aft hook 60 is integrally joined to the panel outer surface at the aft end for supporting the panel from the hanger 42 illustrated in FIG. 1 in a conventional manner.

But for the present invention, the turbine shroud 40 illustrated in FIG. 2 may have any conventional configuration, and is modified for improving its cooling performance.

Figure 3:
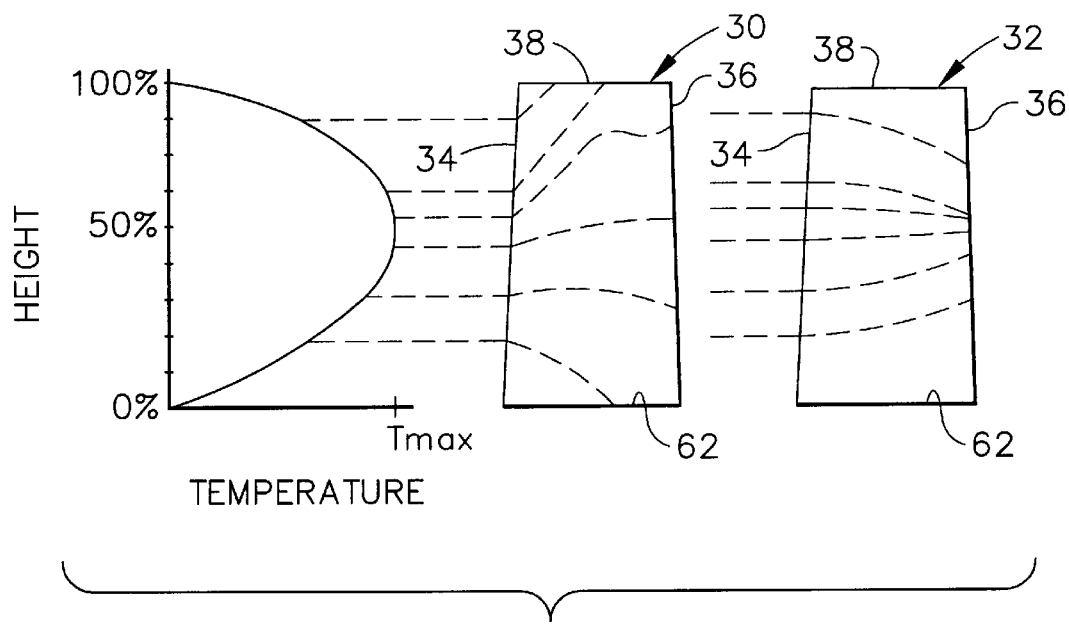
FIG. 3 is a schematic representation of an exemplary relative inlet temperature profile over pressure and suction sides of the blade illustrated in FIG. 1.

FIG. 3 illustrates an exemplary relative inlet temperature profile of the combustion gases 20 as experienced by each of the rotating blades 26. The temperature profile is generally center peaked or generally parabolic as shown at the left of FIG. 3, with a maximum temperature $T_{max}$ typically located in the range of airfoil span or radial height between about 50–70%. Zero percent is at the airfoil root 62, and 100% is at the radially outermost portion or tip 38 of the airfoil.

The corresponding gas temperature pattern experienced by the airfoil pressure side 30 during operation is illustrated in the middle of FIG. 3. And, the gas temperature pattern experienced by the suction side 32 is illustrated in the right of FIG. 3.

Although the gas temperature pattern experienced by the airfoil is typically center-peaked at the blade leading edges 34, secondary flow fields between circumferentially adjacent airfoils distort the temperature profile substantially in the blade tip region on the pressure sidewall 30. The gas temperature at the pressure side tip region is substantially greater than the temperature at the suction side tip region, and increases with a substantial gradient from the leading edge 34 to the trailing edge 36 at the blade tip.

A corresponding temperature gradient is experienced by the turbine shroud directly atop the blade tip. As FIG. 3 indicates, the temperature of the combustion gases atop the blade tips 38 increases substantially aft of the blade leading edge on the pressure side. As shown in FIG. 2, both the blade tip 38 and the turbine shroud 40 are therefore subject to relatively low temperature combustion gas from their axially forward ends to mid regions thereof at which the secondary flow fields increase the pressure side temperature substantially.

Accordingly, both the blade tips 38 and the turbine shroud 40 are subject to hotter combustion gas temperature from their middle regions to their axially aft ends. Conventional blade tip and turbine shroud cooling is typically uniform in the axial direction with sufficient cooling air being provided for preventing excessive temperature of the these components, particularly at their aft portions. Correspondingly, their forward portions enjoy increased cooling in view of the relatively low temperature combustion gas experienced thereby.

In accordance with the present invention, an improved method of cooling the turbine shroud 40 illustrated in FIG. 2 is provided by preferentially or selectively channeling more cooling air 16 through the shroud adjacent its aft end 56 than adjacent its opposite forward end 54.

Figure 4:
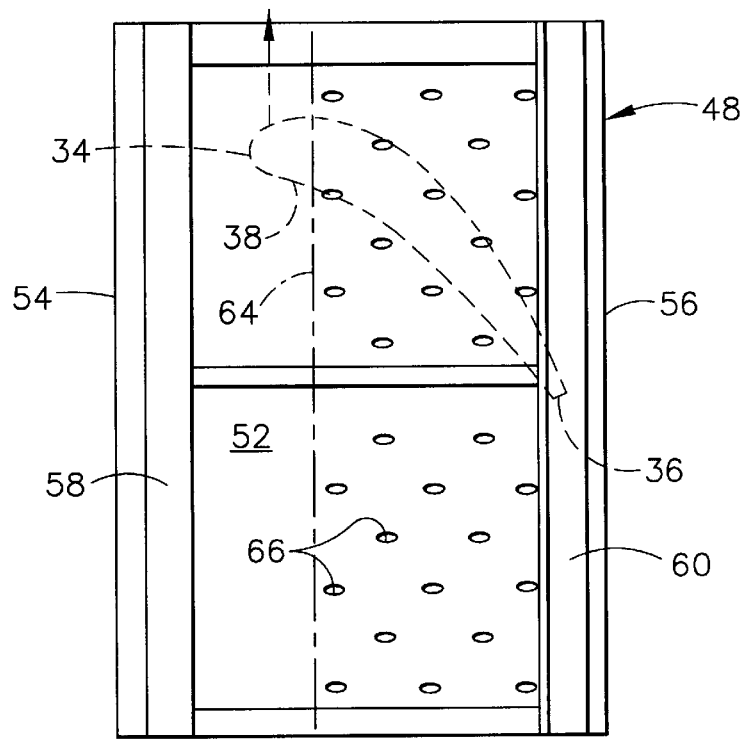
FIG. 4 is a radially outwardly facing plan view of the outer surface of the turbine shroud illustrated in FIG. 2 and taken along line 4—4.
Figure 5:
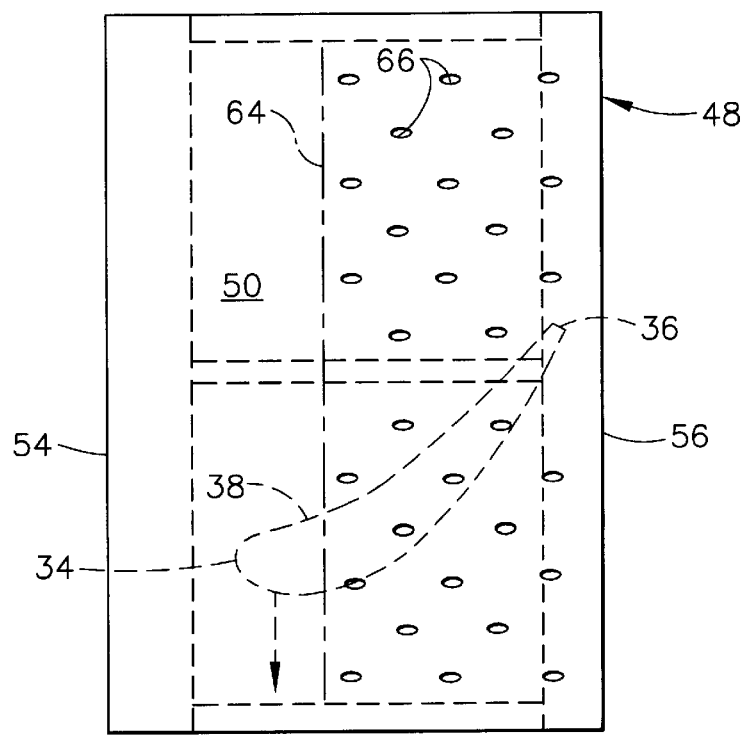
FIG. 5 is a radially inwardly facing plan view of the inner surface of the turbine shroud illustrated in FIG. 2 and taken along line 5—5.

As shown in FIGS. 4 and 5, each shroud panel 48 also includes a middle portion 64 extending between its circumferentially opposite ends and axially intermediate the forward and aft ends 54,56. Means in the exemplary form of a plurality of film cooling holes 66 are provided for channeling more of the cooling air 16 radially through the panel adjacent its aft end 56 than adjacent its forward end 54 for preferential cooling. The cooling holes 66 may have any conventional form such as inclined circular holes extending through the panel 48 for channeling cooling air therethrough, and discharging a film of cooling air in the downstream direction along the panel inner surface 50 for effecting film cooling.

As shown in FIGS. 4 and 5, the cooling holes 66 are arranged in a pattern of axially and circumferentially spaced apart holes having a greater hole density aft of the panel middle 64 than forward thereof. In this way, more holes 66 per unit surface area, and more cooling air per unit surface area, may be provided where most needed to preferentially focus the available cooling air.

The cooling holes 66 are spaced apart in the panels both axially between the middle 64 and aft end 56, and circumferentially between the adjoining ends of the panels in preferably uniform pattern. In this way, the cooling holes 66 are effective for distributing the cooling air 16 laterally across the shroud inner surface 50 between the middle 64 thereof and the aft end 56 for effecting a substantially uniform layer or blanket of cooling air for film cooling.

The cooling holes 66 are preferably sized in diameter to collectively channel more of the cooling air through the panel aft of the middle 64 than forward of the middle. Correspondingly, the cooling holes 66 have a collective flow area which is greater aft of the middle 64 than forward of the middle.

In the exemplary embodiment illustrated in FIGS. 2, 4, and 5, the panel inner surface 50 is imperforate between the middle 64 and its forward end 54. In this way, the cooling air 16 impinging the panel outer surface 52 is then channeled through the cooling holes 66 into the tip gap G solely aft of the panel middle 64. In alternate embodiments, the panel 48 may include additional film cooling holes 66 extending radially therethrough between the panel middle 64 and its forward end 54, but preferably with a substantially smaller density pattern than the density aft of the middle 64.

For a given pressure of the cooling air 16 atop the panel outer surface 52, increased cooling of the panel between its middle 64 and aft end 56 may be obtained for corresponding with the increasing temperature gradient of the combustion gases 20 experienced by the airfoil pressure sides downstream of their leading edges as illustrated in FIG. 3. The cooling air 16 is thusly preferentially distributed axially along the shroud panels 48 in their aft portions to directly counteract the increasing temperature gradient of the combustion gases experienced thereby. In this way, the available cooling air 16 is better matched to the locally greater heat influx from the combustion gas gradient. Since the forward portions of the shroud panels experience the lower combustion gas temperatures indicated in FIG. 3, they require less cooling for obtaining suitable life thereof.

Film cooling holes in the forward portions of the shroud panels may be eliminated or reduced as required for providing effective cooling thereof, with the density of the film cooling holes in the aft portions of the shroud panels being correspondingly increased for preferential cooling.

As shown in FIGS. 1 and 2, the forward end 54 of the shroud panel extends upstream from the blade leading edge 34 to adjoin the outer band of the HP nozzle 24. The aft end 56 of the shroud panel extends downstream from the blade trailing edge 36 to adjoin the outer band of the LPT nozzle 46. The forward extension of the shroud relative to the blade leading edge is typically axially longer than the aft extension of the shroud from the blade trailing edge.

As a result, the forward portion of the shroud panel is subject to the relatively cooler combustion gas corresponding with the 100% span height of the temperature profile illustrated in FIG. 3. However, due to the secondary flow fields in the combustion gas as indicated above, the temperature of the combustion gases on the blade pressure side 30 increase substantially aft of the blade leading edge and near its tip 38 which also subjects the corresponding portion of the shroud to the increased temperature. The shroud middle 64 may therefore be determined for each particular engine application as that axially intermediate portion between the forward and aft ends of the shroud panel corresponding with the beginning region of the increase in axial temperature gradient caused by the secondary flow fields in the combustion gas.

As shown in FIGS. 2, 4, and 5, the panel middle 64 at which the preferred increased panel cooling commences is preferably disposed downstream or aft of the leading edge 34 of the blade tips 38. For a given pressure of the cooling air 16 outboard of the turbine shroud 40, the greater density and collective flow area of the cooling holes 66 aft of the panel middle 64 focuses the cooling effectiveness over a limited axial extent of both the blade tips 38 and turbine shroud 40 corresponding with the increased temperature gradient of the combustion gases experienced on the blade pressure sides near their tips as shown in FIG. 3. In this way, the available cooling air may be more effectively utilized where it is needed most along the axial extent of the turbine shroud. The turbine shroud forwardly of the selected middle 64 may have few if any of the film cooling holes 66 which provide minimum film cooling of the forward portion of the turbine shroud.

Instead of cooling the turbine shroud in a substantially uniform manner from its forward to aft ends as is typically accomplished, the cooling holes 66 are preferentially concentrated aft of the middle 64 thereof to ensure greater cooling in the aft portion of the turbine shroud as opposed to its forward portion. In this way, the limited available cooling air may be more efficiently utilized for providing greater cooling for the aft portion of the turbine shroud where it is most needed and providing less cooling of the forward portion of the turbine shroud where it is less needed.

As shown in FIG. 2, the pattern of cooling holes 66 is preferably positioned aft of the shroud middle 64 for discharging the cooling air 16 radially inwardly through the shroud 40 and into the tip gap G between the shroud and the turbine blade tips 38 aft of the blade leading edges 34. In this way, the blade tips 38 may be preferentially cooled with more cooling air adjacent the trailing edges 36 thereof than adjacent the leading edges 34 thereof.

Accordingly, the preferential channeling of the cooling air through the aft portion of the turbine shroud 40 not only preferentially cools the turbine shroud itself, but also is effective for preferentially cooling the blade tips 38 against the increasing temperature gradient experienced by the pressure side thereof.

As indicated in FIG. 3, temperature gradient at the blade tips 38 increases aft of the leading edges 34 on the pressure side 30 at an intermediate or midchord region of the blade tip between its leading and trailing edges. The greater density pattern of the cooling holes 66 illustrated in FIGS. 4 and 5 is preferably disposed outboard or atop the blade tips 38 between a preselected midchord location thereof and the trailing edges 36.

As indicated above, the greater density pattern of the cooling holes 66 is preferentially focused atop that portion of the blade tips subject to the increase in temperature gradient of the combustion gases along the pressure side 30. The increased volume of cooling air from the focused cooling holes 66 thusly improves the cooling of the blade tips as well as the turbine shroud against the increasing temperature gradient of the combustion gases in this region. Forward of the turbine shroud middle 64 and forward of the midchord of the blade tip which do not experience the increasing temperature gradient of the combustion gases, correspondingly less cooling air is required.

Accordingly, the preferential cooling of the turbine shroud and blade tip by preferentially distributing more cooling air to the aft portions thereof as compared to the forward portions thereof better utilizes the available cooling air. Increased cooling effectiveness and lower temperature of the turbine shroud and blade tips may be realized, or a reduction in the amount of cooling air may be effected for a given maximum temperature operation of these components. Increased life of both the turbine shrouds and blade tips may therefore be obtained.

Furthermore, the panel inner surface 50 may include spaced apart dimples or slots (not shown) recessed therein in which one or more of the cooling holes 66 may terminate. The recessed dimples and slots reduce surface area of the panel inner surface against which the blade tips may rub. This will thusly reduce friction heating during tip rubs, and protect the cooling holes from being closed thereby.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine shroud comprising:

a panel having a forward end, and opposite aft end, and a middle therebetween; and a plurality of cooling holes extending through said panel for channeling cooling air therethrough, and arranged in a pattern of greater density aft of said middle to adjacent said aft end than forward of said middle to adjacent said forward end for cooling said panel in aft portion from said middle to said aft end more than in forward portion from said middle to said forward end.

2. A shroud according to claim 1 wherein said cooling holes are sized to collectively channel more of said cooling air through said panel aft of said middle than forward of said middle.

3. A shroud according to claim 2 wherein said cooling holes are spaced apart in said panel both axially between said middle and aft end, and circumferentially.

4. A shroud according to claim 3 in combination with a row of turbine blades each having a radially outer tip extending between leading and trailing edges, and spaced radially from said shroud to define a tip gap therebetween, and wherein:

said panel forward end is spaced forward of said tip leading edge;

said panel aft end is spaced aft of said tip trailing edge; and said greater density pattern of cooling holes through said panel is disposed atop said blade tips between a midchord thereof and said trailing edges.

5. A turbine shroud for surrounding a row of turbine blades each having a radially outer tip extending between leading and trailing edges thereof, and comprising:

a panel having an inner surface for facing said blade tips and defining therewith a tip gap, an opposite outer surface, a forward end positionable adjacent said tip leading edge, an aft end positionable adjacent said tip trailing edge, and a middle disposed intermediate between said forward and aft ends and positionable adjacent a midchord of said blade tip;

forward and aft hooks integrally joined to said panel forward and aft ends, respectively, for supporting said panel; and a plurality of cooling holes extending through said panel between said outer and inner surfaces for channeling cooling air therethrough, and arranged in a pattern of greater density aft of said middle to adjacent said aft end than forward of said middle to adjacent said forward end for cooling said panel in aft portion from said middle to said aft end more than in forward portion from said middle to said forward end.

6. A shroud according to claim 5 wherein said cooling holes have a collective flow area greater aft of said middle than forward of said middle.

7. A shroud according to claim 6 wherein said panel inner surface is imperforate between said middle and forward end.

8. A shroud according to claim 7 wherein said cooling hole pattern in said shroud panel is positioned for discharging said cooling air in said tip gap atop said blade tips and aft of said leading edges thereof.

9. A turbine shroud comprising:

a panel having a forward end, an opposite aft end, and a middle therebetween; and means for channeling more cooling air through said panel adjacent said aft end than adjacent said forward end for cooling said panel in aft portion from said middle to said aft end more than in forward portion from said middle to said forward end.

10. A shroud according to claim 9 wherein said shroud panel includes a middle disposed intermediate between said forward and aft ends, and said channeling means are effective for channeling more of said cooling air through said panel aft of said middle than forward of said middle.

11. A shroud according to claim 10 in combination with a row of turbine blades each having a radially outer tip extending between leading and trailing edges, and spaced radially from said shroud to define a tip gap therebetween, and said channeling means are further effective for discharging said cooling air through said shroud panel into said tip gap for cooling said blade tips more adjacent said trailing edges than adjacent said leading edges thereof.

12. A method of cooling a turbine shroud comprising channeling more cooling air through said shroud adjacent an aft end thereof than adjacent an opposite forward end thereof for cooling said panel in aft portion from a middle thereof to said aft end more than in forward portion from said middle to said forward end.

13. A method according to claim 12 further comprising distributing said cooling air across said shroud between said middle thereof and said aft end.

14. A method according to claim 13 further comprising discharging said cooling air through said shroud into a gap between said shroud and turbine blade tips for cooling said blade tips more adjacent said trailing edges thereof than adjacent said leading edges thereof.

* * * * *